UNITED STATES PATENT OFFICE.

WINFIELD H. GIBSON, OF HOMESTEAD, AND HENRY WESSLING, OF HOPE-CHURCH, PENNSYLVANIA.

SILICA BRICK.

SPECIFICATION forming part of Letters Patent No. 701,708, dated June 3, 1902.

Application filed May 29, 1901. Serial No. 62,432. (Specimens.)

*To all whom it may concern:*

Be it known that we, WINFIELD H. GIBSON, residing at Homestead, and HENRY WESSLING, residing at Hopechurch, in the county of Allegheny and State of Pennsylvania, citizens of the United States, have jointly invented or discovered a certain new and useful Improvement in Silica Bricks, of which improvement the following is a specification.

Our invention relates to fire-brick, and particularly to that class of fire-brick known as "silica" brick.

Heretofore, so far as we are aware, in the production or manufacture of silica brick it has been impossible to aggregate, bond, or compact a mass of pure silica and prevent the same from disintegrating or flying apart when subjected to high temperature. The usual manner of bonding silica brick is by the use of lime, which serves as a flux, which under considerable temperature serves to cement the silica and hold the same in a compact body. The lime is objectionable, for however small the percentage thereof is used the brick is liable to and in practice does fuse at a temperature sufficient to fuse the lime, which is many degrees lower in temperature than that at which the silica comprising the body of the brick would fuse. Another method of bonding silica brick is that of using alkaline silicates combined with carbonaceous matter. This method is also objectionable for the reason above stated.

The object of our present invention is to produce a refractory brick or fireproof material composed of substantially pure coarsely-ground silica rock, bonded with substantially pure or pure silica reduced to a powder, in which condition the bonding silica is sintered or fused between the crystals of the coarser material, producing a fireproof material or brick which when burned is of relatively great specific gravity and density and capable of resisting or withstanding the highest temperature to which this character of material or brick is usually subjected—as, for instance, when used to line steel melting-furnaces—and also remaining intact when subjected to intermittent temperature.

In the production of our improved silica brick or fireproof material we reduce pure or substantially pure silica rock to the condition of fineness to which it is now usual to reduce it prior to compressing the mass into the form of bricks. We then add to and mix therewith a quantity of the same material, preferably pure silica, reduced to a very fine impalpable powder. We have found by successful practice that about one hundred and fifty pounds (150 lbs.) of the finely-powdered silica added to and mixed with six thousand pounds (6,000 lbs.) of coarsely-crushed silica rock produces fireproof material or bricks of excellent character.

In the production of our fireproof material or brick we preferably mix the powdered silica with sufficient water to form a liquid, in which the powdered silica is held in suspension, then pour the same into and mix thoroughly with the coarser silica. The usual method or manner of drying, burning, and cooling bricks is employed.

Brick or fireproof material produced according to our invention is characterized by a specific gravity or density of about 2.21 and porosity of about 8.21 per cent. The specific gravity of the silica rock employed will vary from 1.95 to 2.49.

Among the radical differences existing in our brick or fireproof material over such brick or fireproof material as has heretofore been known to the art are its relatively great density or specific gravity and relatively small degree of porosity and substantial freedom from lime and alkaline silicates, in consequence of which it is adapted to withstand a very high degree of temperature, whether intermittent or continuous, and is of particular value for lining steel melting-furnaces, as it will most satisfactorily withstand disintegration from the splashing hot metal. We have found by actual tests that brick constructed in accordance with our invention are capable of withstanding a very much higher degree of temperature and for a period of time at least fifty per cent. longer than is possible to be attained in the use of the best silica brick heretofore known in the art.

We do not herein claim the method of producing our brick or fireproof material, the same being the subject-matter of our copending application, Serial No. 40,150, filed December 17, 1900.

We claim as our invention and desire to secure by Letters Patent—

1. As a new article of manufacture, a refractory brick or fireproof material composed of substantially pure silica substantially free from lime and alkaline-metal silicates, and being substantially non-porous and of relatively great density.

2. A refractory brick or fireproof material composed of substantially pure silica substantially free from lime and alkaline-metal silicates and having a porosity of substantially 8.21 per cent. and a density or specific gravity of substantially 2.21.

WINFIELD H. GIBSON.
HENRY WESSLING.

Witnesses:
CLARENCE A. WILLIAMS,
JOHN H. RONEY.